United States Patent
Vyas et al.

(10) Patent No.: US 8,118,237 B2
(45) Date of Patent: Feb. 21, 2012

(54) SYSTEM AND METHOD FOR VEHICLE TEMPERATURE CONTROL

(75) Inventors: Parag Vyas, Munich (DE); Oliver Mayer, Munich (DE); Marko Klaus Baller, Saarbrucken (DE); Jan Hemmelmann, Munich (DE); Robert Roesner, Unterfoehring (DE); Michal-Wolfgang Waszak, Nandlstadt (DE); Manon Engelmann, Hallbergmoos (DE); Alexander Felix Fiseni, Munich (DE); Stefan Schroeder, Munich (DE); Yaru Mendez Hernandez, Munich (DE); Mark R. Lynass, Munich (DE); Joerg Stromberger, Hallbergmoos (DE)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 12/371,675

(22) Filed: Feb. 16, 2009

(65) Prior Publication Data
US 2010/0206957 A1  Aug. 19, 2010

(51) Int. Cl.
*G05D 23/00* (2006.01)
(52) U.S. Cl. ............ 236/46 C; 236/51; 62/157; 62/231; 62/236; 62/244
(58) Field of Classification Search ................ 236/46 C, 236/51; 62/157, 231, 236, 244
See application file for complete search history.

(56) References Cited

U.S. PATENT DOCUMENTS

| | | | |
|---|---|---|---|
| 5,595,064 A * | 1/1997 | Ikeda et al. ..................... | 62/126 |
| 2010/0072290 A1* | 3/2010 | Dage .............................. | 236/51 |
| 2010/0132388 A1* | 6/2010 | Oyobe et al. .................... | 62/157 |

FOREIGN PATENT DOCUMENTS

JP  07193901 A  *  7/1995

OTHER PUBLICATIONS

Machine translation of the specification of JP 07193901A, Katoda et al., Jul. 1995, Japan.*

* cited by examiner

*Primary Examiner* — Marc Norman
(74) *Attorney, Agent, or Firm* — Ziolkowski Patent Solutions Group, SC; Joan K. Testa

(57) ABSTRACT

A vehicle includes a power connector configured to mate with an electrical power grid receptacle and receive a grid power therefrom and a heating and cooling system electrically connected to the power connector to receive grid power therefrom and configured to modify a temperature the vehicle cabin. The vehicle also includes a temperature control loop configured to selectively activate and control the heating and cooling system and a controller configured to receive a first input signal comprising a desired vehicle activation time and a second input signal comprising a starting vehicle cabin temperature and a desired vehicle cabin temperature. The controller determines a temperature control loop activation time based on the first and second input signals that is prior to the desired vehicle activation time and transmits an activation signal to the temperature control loop at the temperature control loop activation time to activate the heating and cooling system.

23 Claims, 2 Drawing Sheets

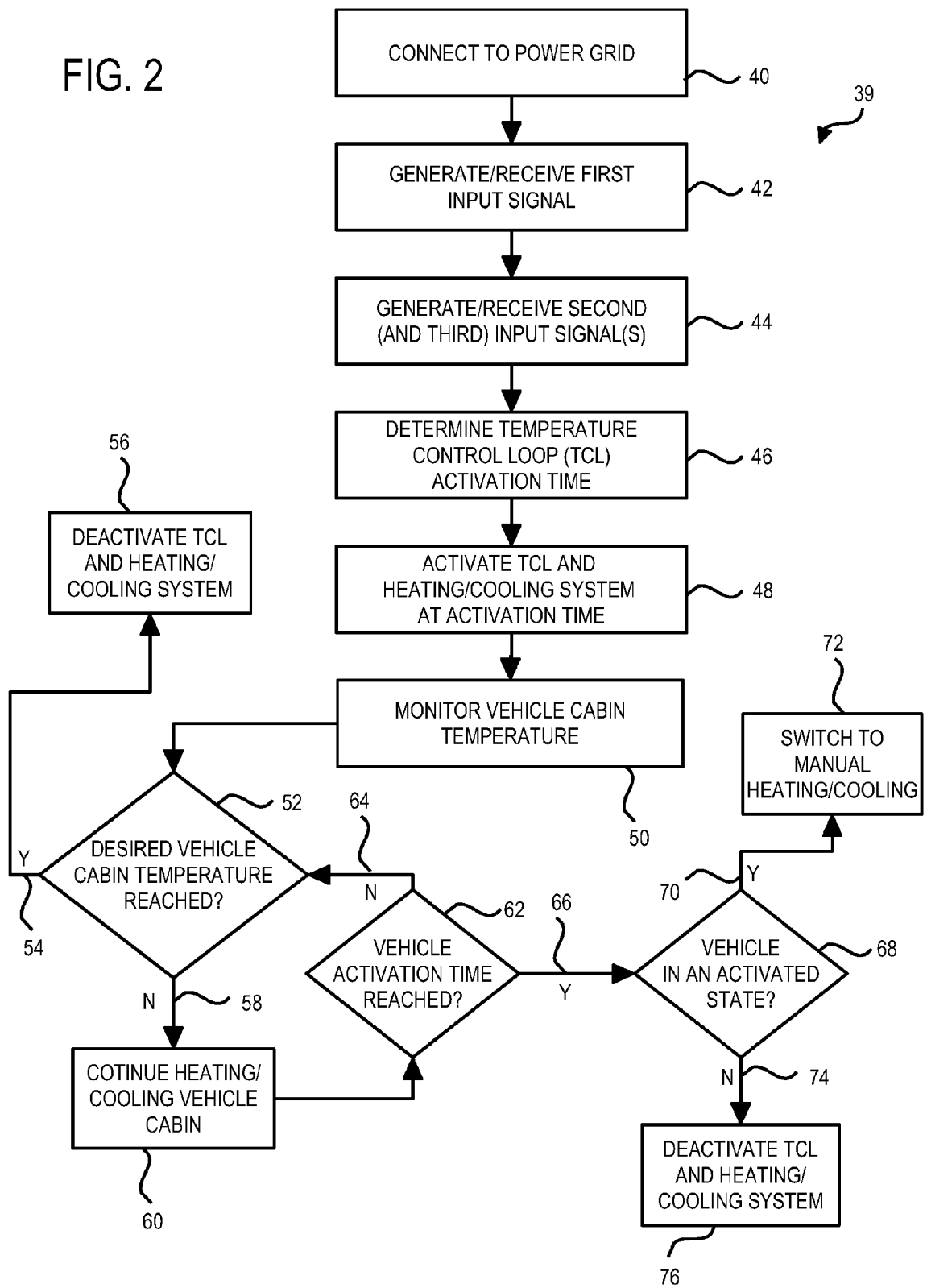

SYSTEM AND METHOD FOR VEHICLE TEMPERATURE CONTROL

BACKGROUND OF THE INVENTION

The invention relates generally to vehicle temperature control and, more particularly, to a system and method for pre-heating and cooling of the vehicle prior to an operator use thereof.

Recently, electric vehicles and plug-in hybrid electric vehicles have become increasingly popular and accessible from a cost perspective. These vehicles are typically powered by an energy storage system including one or more batteries, either alone or in combination with an internal combustion engine. In electric vehicles, the one or more batteries power the entire drive system, thereby eliminating the need for an internal combustion engine. Plug-in hybrid electric vehicles, on the other hand, include a small internal combustion engine to supplement the battery power, which greatly increases the fuel efficiency of the vehicle.

For electric vehicles and plug-in hybrid electric vehicles, recharging of the battery is performed by connecting the vehicle to the electrical power grid when the vehicle is not in use. The vehicle is typically charged overnight or during other extended periods when the vehicle is in an idle state to fully recharge the battery and allow for a maximum period of operation of the vehicle. The charge of the battery is reduced during operation of the vehicle based on power demands of the electric motor to propel the vehicle and based on power demands of auxiliary devices in the vehicle, such as lights, windshield wipers, and heating/cooling systems. As electric vehicles lack a combustion engine, combustion engine based power is not available to power heating/cooling systems in the vehicle, and, as such, heating or cooling of the vehicle cabin is accomplished with electrical power. This heating/cooling of the vehicle cabin is a drain on the battery, and thus reduces the range of the vehicle and/or the power available for traction in the electric motor.

The power demands placed on the battery could be greatly reduced were the vehicle cabin to be pre-heated or pre-cooled before operation of the vehicle. That is, as the initial heating/cooling of the vehicle from an ambient temperature to a desired temperature can place a sizeable power demand on the battery, it would be desirable for such heating/cooling of the vehicle to be performed without drawing power from the battery, such as by pre-heating/cooling the vehicle by drawing power from the electrical power grid when the vehicle is connected thereto during a recharging period.

Therefore, a need exists for a system that provides pre-heating or pre-cooling of the vehicle cabin without drawing power from the battery. It is further desired that such a system be controlled to provide timely heating/cooling of the vehicle to minimize power consumption.

BRIEF DESCRIPTION OF THE INVENTION

The invention is a directed method and apparatus for controlling vehicle cabin temperature. Specifically, embodiments of the invention are directed to a system and method for pre-heating and cooling of the vehicle cabin prior to an operator use thereof. A controller in the vehicle receives input signals regarding a desired vehicle activation time, a starting vehicle cabin temperature, and a desired vehicle cabin temperature. The controller determines a temperature control loop activation time based on the first and second input signals and transmits an activation signal to the temperature control loop at the temperature control loop activation time to activate a heating and cooling system in the vehicle prior to an operator use of the vehicle.

In accordance with one aspect of the invention, a vehicle includes a power connector configured to mate with an electrical power grid receptacle and receive a grid power therefrom and a heating and cooling system electrically connected to the power connector to receive grid power therefrom and configured to modify a temperature in a cabin of the vehicle. The vehicle also includes a temperature control loop configured to selectively activate and control the heating and cooling system and a controller configured to receive a first input signal comprising a desired vehicle activation time and receive a second input signal comprising a starting vehicle cabin temperature and a desired vehicle cabin temperature. The controller is further configured to determine a temperature control loop activation time based on the first and second input signals, the temperature control loop activation time being a time prior to the desired vehicle activation time and transmit an activation signal to the temperature control loop at the temperature control loop activation time to activate the heating and cooling system.

In accordance with another aspect of the invention, a method for controlled temperature modification includes the step of inputting a planned use for a vehicle into a temperature control system, the planned use comprising a future time at which the vehicle is started. The method also includes the steps of measuring a vehicle cabin temperature and comparing the measured vehicle cabin temperature to a desired vehicle cabin temperature. The method further includes the steps of determining an activation time for the temperature control system based on the planned vehicle use, the measured vehicle cabin temperature, and the desired vehicle cabin temperature and activating the temperature control system at the determined activation time to modify the vehicle cabin temperature.

In accordance with yet another aspect of the invention, a temperature control system includes a heating and cooling system configured to modify an air temperature in a vehicle cabin, an internal temperature sensor positioned to measure a starting cabin air temperature in the vehicle cabin, and a temperature control loop configured to selectively activate the heating and cooling system and comprising a user input for setting a desired cabin air temperature. The temperature control system also includes a controller programmed to receive a command signal indicative of a desired vehicle activation time and receive the starting cabin air temperature and the desired cabin temperature. The controller is further programmed to determine a temperature modification period based on the desired vehicle activation time, the starting cabin air temperature cabin, and the desired cabin air temperature, and transmit an activation signal to the temperature control loop at a beginning of the temperature modification period to activate the heating and cooling system.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 2 is a flow diagram of a controller implemented technique for controlled pre-heating or pre-cooling of a vehicle by way of the temperature control system illustrated in FIG. 1.

DETAILED DESCRIPTION OF THE PREFERRED EMBODIMENT

Figure 1:
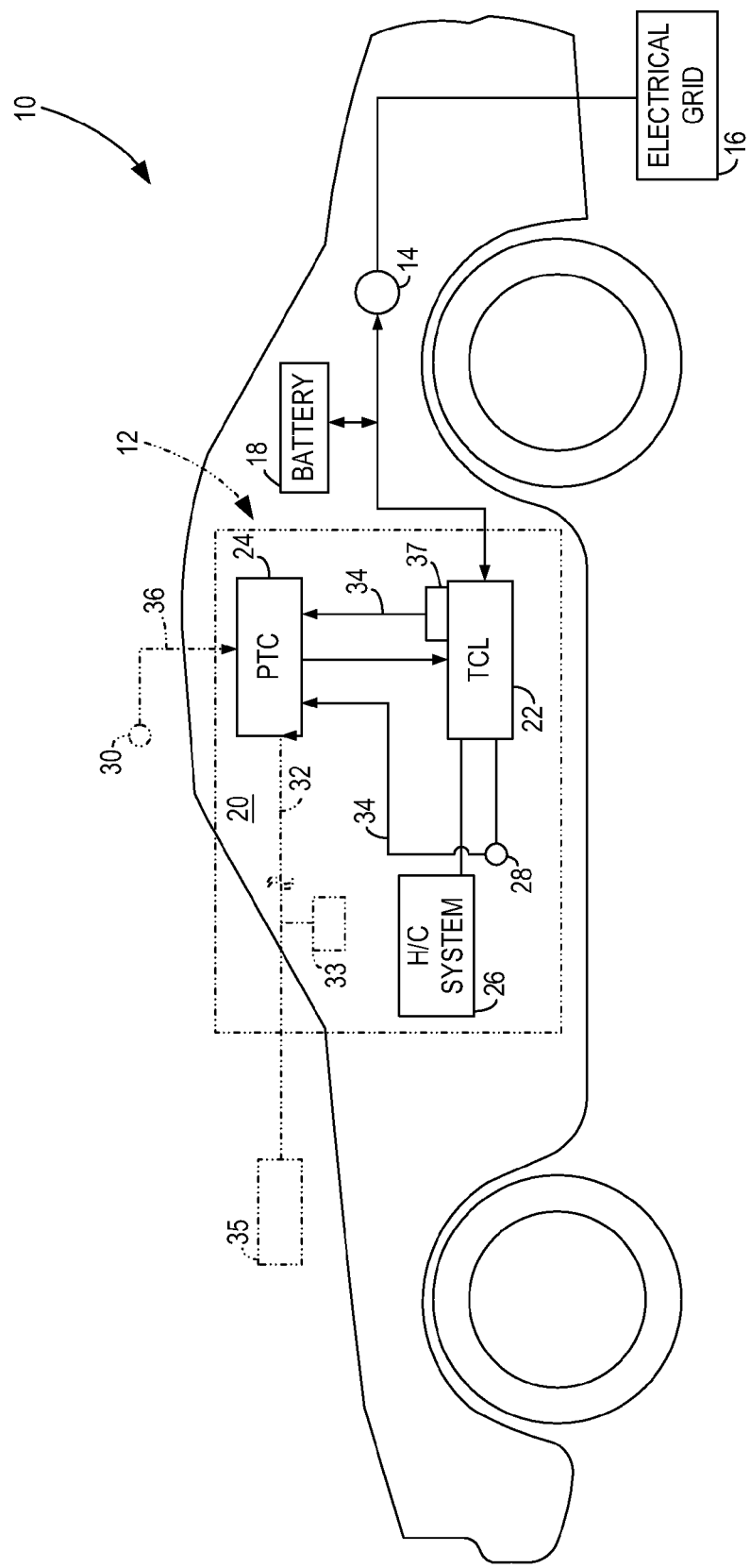
FIG. 1 is a block schematic diagram of a vehicle including a temperature control system according to an embodiment of the invention.

Embodiments of the invention are directed to systems and methods for pre-heating and cooling of a vehicle during re-charging of an onboard energy storage system. A vehicle, such as a Battery Powered Electric Vehicle or a Plug-in Hybrid Electric Vehicle, includes therein a temperature control loop for activating heating and cooling systems in the vehicle and a control system to control operation of the temperature control loop based on operator input and measured vehicle parameters.

Referring to FIG. 1, a block schematic diagram of a vehicle 10 having a temperature control system 12 thereon is shown according to an embodiment of the invention. According to embodiments of the invention, vehicle 10 is a Battery Powered Electric Vehicle (BEV) or a Plug-in Hybrid Electric Vehicle (PHEV) and includes therein a power connector 14 (i.e., a plug or a flexible cable extension with a plug-in socket) configured to mate with an electrical grid power receptacle 16. When connected to electrical grid power receptacle 16, power connector 14 provides a recharging "grid power" to an on-board energy storage system 18 of vehicle 10. That is, when vehicle 10 is an idle or "off" state, power connector 14 can be plugged-in to electrical grid power receptacle 16 to recharge the on-board energy storage system 18. While on-board energy storage system 18 is shown in FIG. 1 as a single battery, it is recognized that the on-board energy storage system 18 could be comprised of a series of batteries and could also include other energy storage devices, such as ultracapacitors, flywheels with a bi-directional electric interface, or the like.

When connected to electrical grid power receptacle 16, power connector 14 also provides grid power to temperature control system 12 of vehicle 10. According to embodiments of the invention, temperature control system 12 is configured to operate when vehicle 10 is in an idle/off state to provide pre-heating or pre-cooling to a cabin 20 of the vehicle and bring a temperature of the air in the cabin to a desired level before an intended start-up or use of the vehicle by an operator. As the temperature control system 12 uses grid power from the electrical power grid, provided by connection of power connector 14 to electrical grid power receptacle 16, no power is drawn from on-board energy storage system 18 to run the temperature control system 12. Thus, no power demand is placed on the battery in heating/cooling the vehicle cabin 20 to a desired temperature, reducing a drain on the energy storage system 18 and allowing for conservation of power in the energy storage system, thus increasing the range of the vehicle and/or the power available for traction in the electric motor (not shown) of the vehicle during a subsequent use/trip.

Referring still to FIG. 1, temperature control system 12 is shown as including a temperature control loop 22 electrically connected to the power connector 14 and a controller 24 (i.e., pre-heat/pre-cool temperature controller) connected to the temperature control loop 22 and in communication therewith. Temperature control system 12 also includes a heating and cooling system 26 configured to heat or cool the vehicle cabin 20, which can form part of the vehicle standard equipment e.g. air conditioning compressor, heaters, blowers. The heating/cooling system 26 can comprise standard heating and air conditioning units, as known in the art. A first temperature sensor 28 (i.e., internal temperature sensor) is also included in temperature control system 12 and is positioned in the vehicle cabin 20 to measure a temperature of the air therein. The external temperature sensor 28 can also be used as an input signal for the controller 24 in order to make calculations of thermal and hence electric power requirements, if desired, especially if the electric power supply observes limitations in the energy supply (limited power or the like). According to the embodiment of the invention shown in FIG. 1, temperature control system 12 also includes a second temperature sensor 30 (i.e., external temperature sensor) that is positioned outside of the vehicle cabin 20 and that is configured to measure an air temperature of the ambient environment outside of vehicle 10.

In operation, temperature control system 12 is configured to pre-heat/pre-cool the vehicle cabin 20 at a determined time before start-up and use of the vehicle 10 by an operator. When controller 24 of temperature control system 12 is in a powered state based on connection of vehicle 10 to the electrical power grid (by way of power connector 14 to power receptacle 16), controller 24 is in a readied state to receive a plurality of input signals. As explained in greater detail below, the input signals provided to controller 24 are used by the controller to determine a time at which to activate temperature control loop 22 to initiate heating/cooling of the vehicle cabin 20 by way of the heating/cooling system 26. The temperature control loop activation time is a time prior to the vehicle activation time and is a time determined by the controller 24 that allows sufficient time for heating/cooling of the vehicle cabin 20 from a starting temperature to a desired temperature.

As shown in FIG. 1, the input signals received by controller 24 include a first input signal 32 containing data/information on a desired time for start-up and use of the vehicle 10. According to one embodiment of the invention, a programmable timer 33 (shown in phantom) can be set in vehicle 10 to specify the desired start-up/use time. According to another embodiment of the invention, the first input signal 32 can be provided by an operator by way of an external source, such as a wireless signal from a remote control device 35 (shown in phantom). That is, an operator can transmit the first input signal 32 to controller 24 by way of a wireless signal at a desired time to indicate a desired/planned start-up time or period of use of the vehicle 10. It is also envisioned that the first input signal 32 could be transmitted by an operator to controller 24 by way of, for example, internet based protocol, other protocol based communication bus (e.g. controller-area network (CAN) bus), or mobile phone text messaging, and that controller 24 could be configured to receive and process such signals.

According to another embodiment of the invention, the first input signal 32 that comprises information on a desired time for start-up and use of the vehicle 10 can be generated by/in the controller 24. That is, according to an embodiment of the invention, controller 24 is configured/programmed to identify a pattern of use of the vehicle 10 and determine when a next start-up/use of the vehicle 10 will occur based on this past pattern of use. For example, controller 24 could identify that an operator has a past pattern of usage of the vehicle that includes a vehicle start-up at 7:00 AM every Monday to Friday, and generate the first input signal 32 in response thereto that specifies that a start-up/use of the vehicle 10 will occur on those days/times.

In addition to receiving the first input signal 32 indicative of a desired/planned start-up time or period of use of the vehicle 10, controller 24 also receives a second input signal 34 that includes data on an operator desired temperature of the vehicle cabin 20 and on a starting temperature of the vehicle cabin 20 at a time at which the first input signal 32 is received. The desired vehicle cabin temperature can be set by an operator via a temperature input device 37 that is part of temperature control loop 22, such as climate controls typically found in a vehicle, and this desired vehicle cabin temperature input is then transmitted to controller 24 as part of second input signal 34. As another part of the second input signal 34, controller 24 receives data on the starting temperature of the vehicle cabin 20 from, and as measured by, first temperature sensor 28.

From the data provided by first input signal 32 and second input signal 34, controller 24 is provided with input to determine an optimal time at which temperature control loop 22 is to be activated prior to the desired time for start-up and use of the vehicle 10. The optimal time for activation of the temperature control loop 22 is a period of time before the desired vehicle start-up time that allows for heating and cooling system 26 to heat/cool the vehicle cabin 20 from a starting vehicle cabin temperature (as measured at the time of the receiving of first input signal 32 by controller 24) to the desired vehicle cabin temperature. The optimal time for activation of the temperature control loop 22 is determined by controller 24 based on a temperature differential between the desired temperature of the vehicle cabin and the starting temperature of the vehicle cabin, as the greater the difference between the temperatures the greater amount of time will be required to heat/cool the vehicle cabin 20.

According to one embodiment of the invention, and as shown in FIG. 1, controller 24 also receives a third input signal 36. The third input signal 36 includes data on a temperature of the ambient environment outside of vehicle 10, as measured by second/external temperature sensor 30. The data from third input signal 36 can also be provided to controller 24 to determine the optimal activation time for temperature control loop 22. For a large temperature differential between the desired temperature of the vehicle cabin and the temperature of the ambient environment outside of vehicle 10 (and/or between the starting vehicle cabin temperature and the temperature of the ambient environment outside of vehicle), additional time could be necessary to heat/cool the vehicle cabin to the desired temperature. Thus, controller 24 can be further configured to factor in data from the third input signal 36 in determining the temperature control loop activation time.

At the determined activation time for the temperature control loop 22, controller 24 is configured to transmit an activation signal to temperature control loop 22. In response to the activation signal, temperature control loop 22 activates heating/cooling system 26 to initiate heating/cooling of vehicle cabin 20. Ideally, the actual temperature of the vehicle cabin 20 is modified by heating/cooling system 26 to reach the desired vehicle cabin temperature precisely at the designated start-up time of the vehicle 10. However, if the actual temperature of the vehicle cabin 20 reaches the desired vehicle cabin temperature before the designated start-up time, temperature control loop 22 can deactivate heating/cooling system 26 to prevent further heating/cooling of the vehicle cabin beyond the desired temperature set point, according to an embodiment of the invention.

According to another embodiment of the invention, controller 24 is configured to monitor a state of the vehicle. That is, upon transmission of the activation signal to temperature control loop 22 to commence activation of heating/cooling system 26, controller 24 monitors an operational state of the vehicle to determine if the vehicle 10 is activated at the designated start-up time. If the vehicle 10 is not activated at the designated start-up time, or within a specified amount of time thereafter (e.g., 5 minutes), controller 24 can generate and transmit a deactivation signal to temperature control loop 22, prompting the temperature control loop 22 to deactivate heating/cooling system 26.

According to another embodiment of the invention, the first input signal 32 transmitted to (or generated by) controller 24 not only includes data on a desired start-up time of vehicle 10, but further includes detailed information on a planned use of the vehicle, including a planned duration of a trip (i.e., period-of-use) for the vehicle. The planned period-of-use is included in first input signal 32 and processed by controller 24 in determining the temperature control loop activation time. That is, for a shorter period of use, it is contemplated that only the cabin air need be heated/cooled to reach the desired temperature setting. Alternatively, for longer journeys it may be beneficial to not only heat/cool the air in the cabin, but also heat/cool some surrounding car elements (e.g., glass, cabin, or chassis) to reach a desired temperature so as to provide some element of heat/temperature storage. If the period-of-use defined in first input signal 32 indicates that heating/cooling of surrounding car elements would be beneficial, then controller 24 can adjust the temperature control loop activation time to allow a longer heating/cooling period before the desired start-up time of vehicle 10 to bring the surrounding car elements to a desired temperature.

Referring now to FIG. 2, a controller implemented technique 39 for controlled pre-heating or pre-cooling of a vehicle during a re-charging period is set forth. The technique begins at STEP 40, where the vehicle is connected to the electrical power grid (i.e., utility grid) to provide power for a re-charging of the vehicle on-board energy storage system (e.g., a battery arrangement), provided that power can be drawn from the grid. The grid power also provides power to a temperature control system in the vehicle. At some time during the recharging period, a first input signal is received by, or generated by, a controller in the temperature control system at STEP 42. The first input signal contains therein data on a desired start-up time and use of the vehicle. According to embodiments of the invention, the first input signal can be transmitted to the controller from a programmable timer included in the vehicle that specifies a desired start-up/use time or can be transmitted to the controller via wireless signals from a user operated remote device. That is, an operator can transmit the first input signal to the controller by way of a wireless signal, such as an internet based protocol, a controller-area network (CAN) bus protocol based communication, or mobile phone text messaging.

According to another embodiment of the invention, the first input signal can be generated by the controller at STEP 42. That is, according to an embodiment of the invention, controller is configured/programmed to identify a pattern of use of the vehicle and determine when a next start-up/use of the vehicle will occur based on this past pattern of use. The controller can then generate the first input signal indicative of a next start-up/use of the vehicle of based on this past pattern of use.

Upon receipt/generation of the first input signal and the data contained therein regarding the desired start-up time of the vehicle, the controller receives and processes a second input signal at STEP 44. The second input signal includes therein data on an operator desired air temperature for the cabin of the vehicle and on a starting temperature (i.e., current temperature) of the vehicle cabin at a time at which the first input signal is received. The desired vehicle cabin temperature can be set by an operator via, for example, a temperature input device such as climate controls typically found in a vehicle, and this desired vehicle cabin temperature input is then transmitted to controller as part of second input signal.

As another part of the second input signal, controller receives data on the starting temperature of the vehicle cabin from, and as measured by, a temperature sensor positioned in the vehicle cabin. According to one embodiment of the invention, a third input signal is also received by the controller at STEP 44 and includes therein data on a temperature of the ambient environment outside of the vehicle, as measured by an external temperature sensor, for example.

Upon receiving the data provided by the first input signal and the second (and third) input signal(s), the controller determines at STEP 46 an optimal time at which temperature control loop is to be activated prior to the desired time for start-up and use of the vehicle. The optimal time for activation of the temperature control loop is a period of time before the desired vehicle start-up time that allows for the heating and cooling system to heat/cool the vehicle cabin from a starting vehicle cabin temperature (as measured at the time of the receiving of the first input signal by the controller) to the desired vehicle cabin temperature. The optimal time for activation of the temperature control loop is determined by the controller based on a temperature differential between the desired temperature of the vehicle cabin and the starting temperature of the vehicle cabin, as the greater the difference between the temperatures the greater amount of time will be required to heat/cool the vehicle cabin.

At the determined temperature control loop activation time, the temperature control loop and the heating/cooling system are activated at STEP 48 to initiate heating/cooling of vehicle cabin. Upon activation of the heating/cooling system, the air temperature of the vehicle cabin is monitored at STEP 50. A determination is made at STEP 52 as to whether the vehicle cabin temperature has reached the desired temperature. Ideally, the actual temperature of the vehicle cabin is modified by the heating and cooling system to reach the desired vehicle cabin temperature precisely at the designated start-up time of the vehicle; however it is recognized that the actual temperature of the vehicle cabin may reach the desired vehicle cabin temperature before the designated start-up time. Thus, if it is determined that the desired temperature has been reached 54, the temperature control loop deactivates the heating/cooling system at STEP 56 to prevent further heating/cooling of the vehicle cabin beyond the desired temperature set point. If it is determined that the desired temperature has not been reached 58, the heating/cooling system is maintained in an activated state at STEP 60 to continue heating/cooling of the vehicle cabin toward the desired temperature set point.

During the continued heating/cooling of the vehicle cabin, a determination is made at STEP 62 as to whether the designated vehicle start-up time (or a specified time after the designated vehicle start-up time, such as 5 minutes, for example) has been reached. If it has not been reached 64, the technique returns to STEP 52 to determine if the desired vehicle temperature has been reached. If it is determined that the designated vehicle start-up time has been reached 66, the technique then determines at STEP 68 whether the vehicle is in an active state at that designated vehicle start-up time. If the vehicle is in an active state 70, then it is determined that the pre-heating or pre-cooling of the vehicle during the re-charging period has passed and the technique ends at STEP 72 by switching over to a manual operator control of the heating/cooling of the vehicle cabin. If the vehicle is not in an active state 74, then the heating/cooling system is deactivated by the temperature control loop at STEP 76, based on a deactivation signal generated by the controller. This deactivation of the heating/cooling system thus prevents continued heating/cooling of the vehicle cabin in a case where the vehicle is not activated at the designated vehicle start-up time (or within a certain time thereafter), thus improving efficiency of the system by preventing unnecessary heating/cooling of the vehicle.

While embodiments of the inventions set forth above are directed to a Battery Powered Electric Vehicle (BEV) and a Plug-in Hybrid Electric Vehicle (PHEV), it is also recognized that embodiments of the invention can be implemented in a traditional internal combustion engine (ICE) based vehicle with a battery and electric powered cooling and heating devices. Such ICE-based vehicles would include therein an electric interface (e.g., plug) to connect to an electric power grid in order to provide grid power for pre-cooling and pre-heating of the vehicle cabin via electric appliances in the ICE-based vehicle, such as electric compressors, heaters, blowers, etc.

A technical contribution for the disclosed method and apparatus is that is provides for a controller implemented technique for controlling pre-heating or pre-cooling of a vehicle during a re-charging period (i.e., a deactivated state). The controller controls operation of a temperature control loop and activation of a heating/cooling system in the vehicle based on operator input and measured vehicle parameters, so as to provide controlled pre-heating or pre-cooling of the vehicle.

Therefore, according to one embodiment of the invention, a vehicle includes a power connector configured to mate with an electrical power grid receptacle and receive a grid power therefrom and a heating and cooling system electrically connected to the power connector to receive grid power therefrom and configured to modify a temperature in a cabin of the vehicle. The vehicle also includes a temperature control loop configured to selectively activate and control the heating and cooling system and a controller configured to receive a first input signal comprising a desired vehicle activation time and receive a second input signal comprising a starting vehicle cabin temperature and a desired vehicle cabin temperature. The controller is further configured to determine a temperature control loop activation time based on the first and second input signals, the temperature control loop activation time being a time prior to the desired vehicle activation time and transmit an activation signal to the temperature control loop at the temperature control loop activation time to activate the heating and cooling system.

According to another embodiment of the invention, a method for controlled temperature modification includes the step of inputting a planned use for a vehicle into a temperature control system, the planned use comprising a future time at which the vehicle is started. The method also includes the steps of measuring a vehicle cabin temperature and comparing the measured vehicle cabin temperature to a desired vehicle cabin temperature. The method further includes the steps of determining an activation time for the temperature control system based on the planned vehicle use, the measured vehicle cabin temperature, and the desired vehicle cabin temperature and activating the temperature control system at the determined activation time to modify the vehicle cabin temperature.

According to yet another embodiment of the invention, a temperature control system includes a heating and cooling system configured to modify an air temperature in a vehicle cabin, an internal temperature sensor positioned to measure a starting cabin air temperature in the vehicle cabin, and a temperature control loop configured to selectively activate the heating and cooling system and comprising a user input for setting a desired cabin air temperature. The temperature control system also includes a controller programmed to receive a command signal indicative of a desired vehicle activation time and receive the starting cabin air temperature and the desired cabin temperature. The controller is further programmed to determine a temperature modification period based on the desired vehicle activation time, the starting cabin air temperature cabin, and the desired cabin air temperature, and transmit an activation signal to the temperature control loop at a beginning of the temperature modification period to activate the heating and cooling system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle comprising:
    a power connector configured to mate with an electrical power grid receptacle and receive a grid power therefrom;
    a heating and cooling system electrically connected to the power connector to receive grid power therefrom and configured to modify a temperature in a cabin of the vehicle;
    a temperature control loop configured to selectively activate and control the heating and cooling system; and
    a controller configured to:
        receive a first input signal comprising a desired vehicle activation time;
        receive a second input signal comprising a starting vehicle cabin temperature and a desired vehicle cabin temperature;
        determine a temperature control loop activation time based on the first and second input signals, the temperature control loop activation time being a time prior to the desired vehicle activation time;
        transmit an activation signal to the temperature control loop at the temperature control loop activation time to activate the heating and cooling system;
        determine if the vehicle is activated at the desired vehicle activation time or within a pre-determined time thereafter; and
        if the vehicle is not activated at the desired vehicle activation time or within the pre-determined time thereafter, then transmit a deactivation signal to the temperature control loop to deactivate the heating and cooling system.

2. The vehicle of claim 1 further comprising a first temperature sensor positioned in the vehicle cabin and configured to:
    measure the starting vehicle cabin temperature; and
    transmit the starting vehicle cabin temperature to the controller via the second input signal.

3. The vehicle of claim 2 further comprising a second temperature sensor configured to:
    measure an ambient temperature outside the vehicle cabin; and
    transmit the ambient temperature to the controller via a third input signal.

4. The vehicle of claim 3 wherein the controller is further configured to determine the temperature control loop activation time based on the first, second, and third input signals.

5. The vehicle of claim 1 wherein the temperature control loop is configured to deactivate the heating and cooling system when the starting vehicle cabin temperature reaches the desired vehicle cabin temperature.

6. The vehicle of claim 1 wherein the controller is further configured to:
    determine a pattern of past vehicle usage; and
    generate the first input signal based on the pattern of past vehicle usage.

7. The vehicle of claim 1 further comprising a programmable timer configured to generate the first input signal.

8. The vehicle of claim 1 wherein the first input signal comprises one of a wireless signal, an internet-based protocol, and a controller-area network (CAN) bus based protocol transmitted from a remote device.

9. The vehicle of claim 1 wherein the heating and cooling system, the temperature control loop, and the controller are powered by the grid power.

10. The vehicle of claim 1 wherein the temperature control loop is configured to:
    set the desired vehicle cabin temperature; and
    transmit the desired vehicle cabin temperature to the controller via the second input signal.

11. The vehicle of claim 1 wherein the controller is further configured to modify the temperature control loop activation time based on a planned duration of vehicle use.

12. The vehicle of claim 1 wherein the vehicle comprises an internal combustion engine (ICE) based vehicle, and wherein the grid power is received solely for powering the heating and cooling system, the temperature control loop, and the controller, such that the grid power is supplied thereto without limitations associated with re-charging of a vehicle on-board energy storage system.

13. A method for controlled temperature modification comprising:
    inputting a planned use for a vehicle into a temperature control system, the planned use comprising a future time at which the vehicle is started;
    measuring a vehicle cabin temperature;
    comparing the measured vehicle cabin temperature to a desired vehicle cabin temperature;
    determining an activation time for the temperature control system based on the planned vehicle use, the measured vehicle cabin temperature, and the desired vehicle cabin temperature;
    modifying the determined activation time based on a planned duration of vehicle use; and
    activating the temperature control system at the determined activation time to modify the vehicle cabin temperature.

14. The method of claim 13 wherein activating the temperature control system comprises activating a heating and cooling element in the temperature control system to modify the vehicle cabin temperature.

15. The method of claim 13 further comprising:
    measuring an ambient air temperature outside the vehicle cabin; and
    determining an activation time for the temperature control system based on the planned vehicle use, the measured vehicle cabin temperature, the desired vehicle cabin temperature, and the ambient air temperature.

16. The method of claim 13 further comprising:
    determining if the vehicle is started according to the planned use; and
    deactivating the temperature control system if the vehicle is not started according to the planned use.

17. The method of claim 13 wherein inputting the planned use for the vehicle comprises one of remotely or wirelessly transmitting a planned use to the temperature control system and determining the planned use in temperature control system based on a past vehicle use pattern.

18. A temperature control system comprising:
a heating and cooling system configured to modify an air temperature in a vehicle cabin;
an internal temperature sensor positioned to measure a starting cabin air temperature in the vehicle cabin;
a temperature control loop configured to selectively activate the heating and cooling system and comprising a user input for setting a desired cabin air temperature; and
a controller programmed to:
receive a command signal indicative of a desired vehicle activation time;
receive the starting cabin air temperature and the desired cabin temperature;
determine a temperature modification period based on the desired vehicle activation time, the starting cabin air temperature cabin, and the desired cabin air temperature; and
transmit an activation signal to the temperature control loop at a beginning of the temperature modification period to activate the heating and cooling system;
wherein the controller is further programmed to change a length of the temperature modification period based on a planned duration of vehicle use.

19. The temperature control system of claim 18 wherein the temperature modification period comprises a time needed for the heating and cooling system to modify the starting cabin air temperature to the desired cabin air temperature.

20. The temperature control system of claim 19 wherein the controller is further programmed to:
determine if the vehicle is activated at the desired vehicle activation time or within a pre-determined time thereafter; and
if the vehicle is not activated at the desired vehicle activation time or within the pre-determined time thereafter, then transmit a deactivation signal to the temperature control loop to deactivate the heating and cooling system.

21. The temperature control system of claim 18 further comprising an external temperature sensor configured to measure an ambient air temperature outside the vehicle cabin, and wherein the controller is further programmed to determine the temperature modification period based on the desired vehicle activation time, the starting cabin air temperature cabin, the desired cabin air temperature, and the ambient air temperature outside the vehicle cabin.

22. A vehicle comprising:
a power connector configured to mate with an electrical power grid receptacle and receive a grid power therefrom;
a heating and cooling system electrically connected to the power connector to receive grid power therefrom and configured to modify a temperature in a cabin of the vehicle;
a temperature control loop configured to selectively activate and control the heating and cooling system; and
a controller configured to:
determine a pattern of past vehicle usage;
generate a first input signal based on the pattern of past vehicle usage, the first input signal comprising a desired vehicle activation time;
receive a second input signal comprising a starting vehicle cabin temperature and a desired vehicle cabin temperature;
determine a temperature control loop activation time based on the first and second input signals, the temperature control loop activation time being a time prior to the desired vehicle activation time; and
transmit an activation signal to the temperature control loop at the temperature control loop activation time to activate the heating and cooling system.

23. A vehicle comprising:
a power connector configured to mate with an electrical power grid receptacle and receive a grid power therefrom;
a heating and cooling system electrically connected to the power connector to receive grid power therefrom and configured to modify a temperature in a cabin of the vehicle;
a temperature control loop configured to selectively activate and control the heating and cooling system; and
a controller configured to:
receive a first input signal comprising a desired vehicle activation time;
receive a second input signal comprising a starting vehicle cabin temperature and a desired vehicle cabin temperature;
determine a temperature control loop activation time based on the first and second input signals, the temperature control loop activation time being a time prior to the desired vehicle activation time; and
transmit an activation signal to the temperature control loop at the temperature control loop activation time to activate the heating and cooling system;
wherein the vehicle comprises an internal combustion engine (ICE) based vehicle, and wherein the grid power is received solely for powering the heating and cooling system, the temperature control loop, and the controller, such that the grid power is supplied thereto without limitations associated with re-charging of a vehicle on-board energy storage system.

* * * * *